(12) United States Patent
Suyama et al.

(10) Patent No.: US 9,987,790 B2
(45) Date of Patent: Jun. 5, 2018

(54) BLOW MOLDING APPARATUS (71) Applicants: Kenichi Suyama, Tokyo (JP); Mitsuru Shiokawa, Tokyo (JP); Shinichi Tabata, Tokyo (JP)

(72) Inventors: Kenichi Suyama, Tokyo (JP); Mitsuru Shiokawa, Tokyo (JP); Shinichi Tabata, Tokyo (JP)

(73) Assignee: DISCMA AG, Hünenberg (CH)

( * ) Notice: Subject to any disclaimer, the term of this patent is extended or adjusted under 35 U.S.C. 154(b) by 121 days.

(21) Appl. No.: 15/121,309

(22) PCT Filed: Dec. 22, 2014

(86) PCT No.: PCT/JP2014/006391
§ 371 (c)(1),
(2) Date: Aug. 24, 2016

(87) PCT Pub. No.: WO2015/128919
PCT Pub. Date: Sep. 3, 2015

(65) Prior Publication Data
US 2017/0008215 A1   Jan. 12, 2017

(30) Foreign Application Priority Data
Feb. 28, 2014   (JP) .................. 2014-039180

(51) Int. Cl.
| B29C 49/46 | (2006.01) |
| B29C 49/58 | (2006.01) |
| B29C 49/12 | (2006.01) |
| B65B 3/02  | (2006.01) |
| B65B 3/12  | (2006.01) |
| B29C 49/42 | (2006.01) |
| B29C 49/78 | (2006.01) |

(Continued)

(52) U.S. Cl.
CPC .............. B29C 49/58 (2013.01); B29C 49/12 (2013.01); B29C 49/4289 (2013.01);
(Continued)

(58) Field of Classification Search
CPC ............ B29C 49/46; B29C 2049/4664; B29C 2049/5803; B29C 49/58
See application file for complete search history.

(56) References Cited

U.S. PATENT DOCUMENTS 9,555,574 B2 *   1/2017   Sato ..................... B29C 49/58
9,610,744 B2 *   4/2017   Sato ..................... B29C 49/46
(Continued)

FOREIGN PATENT DOCUMENTS

| JP | 2005-529002 A | 9/2005 |
| JP | 2009-533290 A | 9/2009 |

(Continued)

OTHER PUBLICATIONS

Mar. 17, 2015 International Search Report issued in International Patent Application No. PCT/JP2014/006391.
(Continued)

*Primary Examiner* — Robert B Davis
(74) *Attorney, Agent, or Firm* — Oliff PLC (57) ABSTRACT A pressure is accumulated in advance in a cylinder (35), which is used for conversion to air for the outside of a mouth, with an opening-closing valve (V3) of the cylinder (35) being closed, and when a pressurized liquid (L) is supplied into a preform (PF) through a blow nozzle (13) by actuating a plunger pump (31) and by opening a sealing body (15), the opening-closing valve (V3) of the cylinder (35) is opened to thereby apply the pressure accumulated in the cylinder (35) to the liquid (L) supplied into the preform (PF).

19 Claims, 7 Drawing Sheets

(51) Int. Cl.
*B29C 49/06* (2006.01)
*B29K 23/00* (2006.01)
*B29L 31/00* (2006.01)

(52) U.S. Cl.
CPC ............ *B29C 49/46* (2013.01); *B29C 49/783* (2013.01); *B65B 3/022* (2013.01); *B65B 3/12* (2013.01); *B29C 49/06* (2013.01); *B29C 2049/4664* (2013.01); *B29C 2049/5803* (2013.01); *B29K 2023/12* (2013.01); *B29L 2031/7158* (2013.01)

(56) References Cited

U.S. PATENT DOCUMENTS

| | | |
|---|---|---|
| 2005/0206045 A1 | 9/2005 | Desanaux et al. |
| 2008/0029928 A1 | 2/2008 | Andison et al. |
| 2014/0356475 A1 | 12/2014 | Sato et al. |
| 2015/0076105 A1* | 3/2015 | Sato ........................ B29C 49/06 215/381 |
| 2016/0144550 A1* | 5/2016 | Kumar ................... B29C 49/46 264/524 |

FOREIGN PATENT DOCUMENTS

| | | |
|---|---|---|
| JP | 2013-198999 A | 10/2013 |
| JP | 2013-208834 A | 10/2013 |
| JP | 2013-248748 A | 12/2013 |

OTHER PUBLICATIONS

May 25, 2017 Office Action issued in Chinese Patent Application No. 201480076433.3.

\* cited by examiner

| | Air pressure to be applied to outside of mouth (MPa) | 0.00 | 4.00 |
|---|---|---|---|
| Opening-closing valve of cylinder used for conversion to air for outside of mouth OPEN | Assessment | Bad | Good |
| | Time to PEAK (second) | ND | 0.19 |
| Opening-closing valve of cylinder used for conversion to air for outside of mouth CLOSE | Assessment | Moderate | Moderate |
| | Time to PEAK (second) | 0.23 | 0.23 |

FIG 7

BLOW MOLDING APPARATUS

TECHNICAL FIELD

The present disclosure relates to a blow molding apparatus that blow molds a bottomed tubular preform into a bottle, and especially to such an apparatus that uses a liquid as a pressurized fluid used for blow molding.

BACKGROUND

Resin bottles, representatives of which are oriented poly-polypropylene (OPP) bottles and poly-ethylene terephthalate (PET) bottles, are used in various fields, such as beverages, foods, cosmetics, and so forth. Such a bottle is typically formed in a predetermined shape by biaxially stretch blow molding a resin preform by using a blow molding apparatus in a state where the resin preform is heated to a temperature at which a stretching effect may be achieved. The resin preform has been formed in a bottomed tubular shape by, for example, injection molding.

Known examples of such a blow molding apparatus include the one that uses a pressurized liquid, instead of pressurized air, as the pressurized fluid that is supplied into the preform. As the liquid to be pressurized in this example, a content liquid, such as a beverage, a cosmetic product, a pharmaceutical product, or the like, that is to be filled into the bottle as a final product may be used. By doing so, the process of filling the content liquid to the bottle may be omitted, and the production process and the configuration of the blow molding apparatus may be simplified.

For example, Patent Literature 1 describes a blow molding apparatus including a blow molding mold to which a preform, after heated to a temperature at which the preform is stretchable, is fitted, a blow nozzle that is fitted to a mouth tubular portion of the preform fitted to the mold, a pressurized liquid supply unit configured to supply a pressurized liquid into the preform through the blow nozzle, and a stretching rod that is freely displaceable in upward and downward directions. By stretching the preform in the longitudinal (axial) direction by the stretching rod and also by stretching the preform in the lateral (radial) direction by supplying the pressurized liquid into the preform, the preform is molded into a bottle having a shape conforming to a cavity of the mold.

CITATION LIST

Patent Literature

PTL1: JP2013208834A

SUMMARY

Technical Problem

A blow molding apparatus as described above may employ a servo plunger-type plunger pump driven by, for example, a servo motor, as the pressurized liquid supply unit configured to supply the pressurized content liquid. Using such a plunger pump as the pressurized liquid supply unit allows a metered amount of the content liquid to be filled into the final bottle with high precision.

To enhance moldability (shaping characteristics) of the bottle obtained as a result of blow molding the preform, the liquid supplied into the preform needs to be pressurized by the plunger pump to a prescribed pressure within a short period of time.

However, in cases of a servo plunger-type plunger pump, a time period necessary for pressurizing the liquid to the prescribed pressure depends on the capability of the servo motor that actuates the plunger pump, and this time period cannot be less than the time it takes for the servo motor operating at the maximum rate, that is to say, to its fullest capability. This sometimes causes the situation where moldability of the bottle is not satisfactorily enhanced.

The present disclosure is to solve the above problem, and the present disclosure is to provide a blow molding apparatus that enhances moldability of the bottle by reducing the time period, necessary for pressurizing the liquid supplied into the preform to the prescribed pressure, to less than the time corresponding to the capability of the pressurized liquid supply unit.

Solution to Problem

One of aspects of the present disclosure resides in a blow molding apparatus that supplies a pressurized liquid into a bottomed tubular preform fitted to a mold used for blow molding and molds the preform into a shape conforming to a cavity of the mold, the blow molding apparatus including: a blow nozzle fitted to a mouth tubular portion of the preform; a sealing body configured to open and close the blow nozzle; a pressurized liquid supply unit connected to the blow nozzle via a liquid flow path; an accumulator that is in branch connection with the liquid flow path; and an opening-closing valve of the accumulator that is disposed between the liquid flow path and the accumulator, wherein a pressure is accumulated in the accumulator in advance, with the opening-closing valve of the accumulator being closed, and when the pressurized liquid is supplied into the preform through the blow nozzle by actuating the pressurized liquid supply unit and by opening the sealing body, the opening-closing valve of the accumulator is opened to thereby apply the pressure accumulated in the accumulator to the liquid supplied into the preform.

In a preferred embodiment of the blow molding apparatus according to the present disclosure, the opening of the opening-closing valve of the accumulator is timed to occur immediately before the opening of the sealing body and to last until before the liquid supplied into the preform reaches a peak pressure.

In another preferred embodiment of the blow molding apparatus according to the present disclosure, the pressure is accumulated in the accumulator in advance, by actuating the pressurized liquid supply unit in a state where the blow nozzle is closed by the sealing body and where the opening-closing valve of the accumulator is opened, and subsequently by closing the opening-closing valve of the accumulator.

In yet another preferred embodiment of the blow molding apparatus according to the present disclosure, the blow molding apparatus further includes: a pressurizing device that drives the accumulator, wherein the pressure is accumulated in the accumulator in advance, by driving the accumulator by the pressurizing device.

In yet another preferred embodiment of the blow molding apparatus according to the present disclosure, the blow molding apparatus further includes air space defined for pressurizing an outside of a mouth and surrounding an outer circumference of a mouth tubular portion of the preform fitted to the mold, wherein the accumulator includes a cylinder used for conversion to air for the outside of the mouth, the cylinder having one end connected to the liquid flow path and another end connected, through a pressurizing flow path, to the air space defined for pressurizing the outside of the mouth.

In yet another preferred embodiment of the blow molding apparatus according to the present disclosure, the pressurizing flow path is provided with an opening-closing valve used for pressurizing air outside the mouth, wherein the opening-closing valve used for pressurizing air outside the mouth is closed when the pressure is accumulated in the accumulator in advance and is opened when the pressurized liquid is supplied into the preform by opening the sealing body.

In yet another preferred embodiment of the blow molding apparatus according to the present disclosure, the pressurized liquid supply unit includes a servo plunger-type plunger pump.

Advantageous Effect

According to the present disclosure, since the pressure is accumulated in the accumulator in advance and since, during the supply of the pressurized liquid into the preform, the liquid is pressurized not only by actuating the pressurized liquid supply unit but also by applying the pressure accumulated in the accumulator to the liquid, the time period necessary for pressurizing the liquid to the prescribed pressure is reduced to less than the time corresponding to the capability of the pressurized liquid supply unit. Accordingly, moldability of the bottle obtained as a result of blow molding the preform is enhanced compared with cases where the liquid is pressurized solely by the pressurized liquid supply unit.

DETAILED DESCRIPTION

The present disclosure will be described in more detail below with reference to the drawings.

Figure 1:
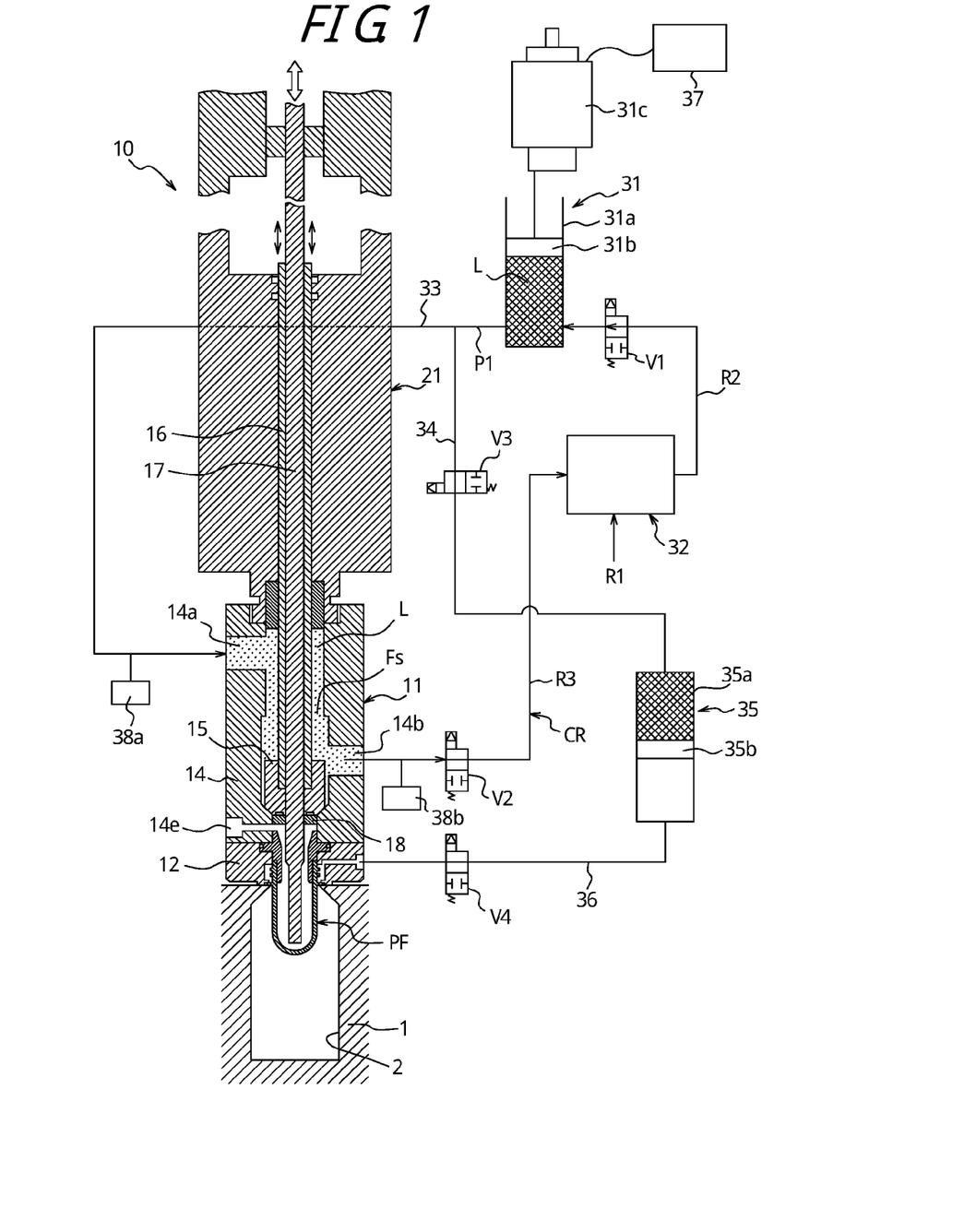
FIG. 1 schematically illustrates a blow molding apparatus according to one of embodiments of the present disclosure.
Figure 2:
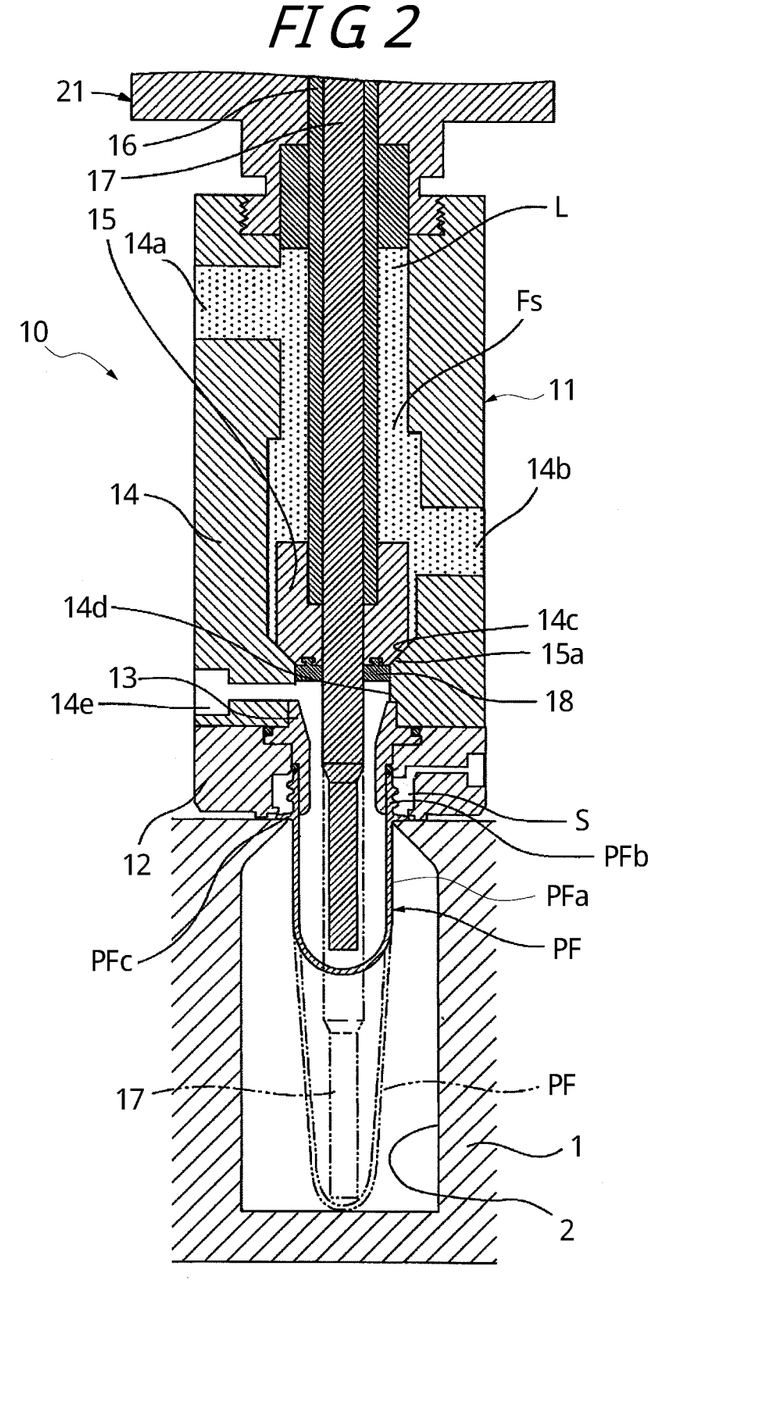
FIG. 2 is an enlarged sectional view of a filling head portion illustrated in FIG. 1.

As illustrated in FIGS. 1 and 2, a blow molding apparatus according to one of embodiments of the present disclosure includes a mold 1 used for blow molding. The mold 1 has a bottle-shaped cavity 2, and the mold 1 is open upward on an upper surface thereof. Although not illustrated in detail, the mold 1 may be opened into right and left mold halves, and a molded product may be removed from the mold 1 by opening the mold 1.

To the mold 1, a preform PF, which is to be blow molded into a bottle by using the blow molding apparatus, may be fitted. FIGS. 1 and 2 illustrate a state where the preform PF is fitted to the mold 1. Examples of the preform PF include the one which is generally formed in a bottomed cylindrical shape by using a resin material, such as polypropylene (PP), which includes a cylindrical mouth tubular portion PFb provided integrally in an upper end of a main body portion PFa having a test tube shape, and which includes a neck ring PFc provided integrally in a lower end portion of the mouth tubular portion PFb. The preform PF is fitted to the mold 1, with the main body portion PFa being disposed within the cavity 2 of the mold 1 along the axis of the cavity 2, with the neck ring PFc abutting against the upper surface of the mold 1, and with the mouth tubular portion PFb protruding to the outside (upward in FIGS. 1 and 2) of the mold 1.

As illustrated in FIG. 1, on an upper side of the mold 1, a nozzle unit 10 is provided in a manner such that the nozzle unit 10 is freely displaceable in upward and downward directions relative to the mold 1. The nozzle nit 10 generally has a tubular shape and includes a filling head portion 11 and a support portion 21 to which the filling head portion 11 is screw-connected detachably like a cartridge.

As illustrated in FIG. 2, the filling head portion 11 includes a holding member 12, a blow nozzle 13, and a supply tubular portion 14.

The holding member 12 is formed in a block shape provided in the middle thereof with a through hole extending vertically, and the tubular blow nozzle 13 is fitted on the inner side of the through hole. When the nozzle unit 10 is displaced downward to the lower end, the mouth tubular portion PFb of the preform PF fitted to the mold 1 is located in the through hole with the blow nozzle 13 being fitted inside the mouth tubular portion PFb, and the neck ring PFc is sandwiched between the lower end of the holding member 12 and the upper surface of the mold 1, and thus, the preform PF is held in a fitted position that is perpendicular to the mold 1.

The supply tubular portion 14 is formed as a cylindrical member provided inside thereof with a supply path Fs extending vertically. The supply tubular portion 14 is fixed to an upper end of the holding member 12, and the supply tubular portion 14, together with the holding member 12, is displaceable upward and downward relative to the mold 1. The supply tubular portion 14 is provided on an upper end side thereof with an introduction port 14a communicating with the supply path Fs and is also provided on a lower end side thereof with a discharge port 14b communicating with the supply path Fs. Furthermore, the supply tubular portion 14 is provided, in a lower end of an inner surface thereof that forms the supply path Fs, with a sealing surface 14c having a conical surface shape inclined with a diameter decreasing downward. In the axis of the sealing surface 14c, a supply hole 14d, through which the supply path Fs opens downward into communication with the blow nozzle 13, is also provided.

In the supply path Fs, a sealing body 15, configured to open and close the supply hole 14d, and thus, the blow nozzle 13, is disposed. The sealing body 15 is formed in a short cylindrical shape and provided, in an outer peripheral portion of a lower end surface thereof, with a tapered abutment surface 15a. The abutment surface 15a has the same inclination angle as that of the sealing surface 14c, so that the abutment surface 15a may closely contact the sealing surface 14c. In the supply path Fs, a shaft body 16 with a long and narrow cylindrical rod shape is disposed along the axis of the supply path Fs. The shaft body 16 extends through the upper end of the supply tubular portion 14 in a liquid-tight fashion and is supported by the support portion 21 in a manner such that the shaft body 16 is freely displaceable in upward and downward directions with respect to the filling head portion 11 and the support portion 21. The sealing body 15 is coaxially fixed to a lower end of the shaft body 16, and the sealing body 15, together with the shaft body 16, is freely displaceable upward and downward within the supply path Fs. When the shaft body 16 is displaced to the lowermost stroke limit, the abutment surface 15a of the sealing body 15 abuts against the sealing surface 14c provided in the lower end portion of the supply tubular portion 14. Thus, the blow nozzle 13 is closed by the sealing body 15. On the other hand, when the sealing body 15, together with the shaft body 16, is displaced upward, the abutment surface 15a of the sealing body 15 comes off the sealing surface 14c provided in the supply tubular portion 14, and thus, the blow nozzle 13 is opened.

The shaft body 16 is hollow, and a stretching rod 17 is slidably fitted inside the shaft body 16. The stretching rod 17 is displaceable in the axis direction relatively with respect to the shaft body 16, and a lower end of the stretching rod 17 protrudes from a lower end of the sealing body 15. As represented by a two-dot chain line in FIG. 2, the stretching rod 17 may stretch the preform PF in the longitudinal (axial) direction by being displaced downward.

Additionally, in the lower end of the sealing body 15, a short cylindrical guiding body 18 made of polyetheretherketone (PEEK) resin is fixed to guide the stretching rod 17.

As illustrated in FIG. 1, a plunger pump 31, as the pressurized liquid supply unit, and a liquid circulation unit 32 are connected to the nozzle unit 10.

The plunger pump 31 includes a cylinder 31a and a plunger 31b fitted in the cylinder 31a in a manner such that the plunger 31b is displaceable along the axis direction, and an outlet of the plunger pump 31 is connected to the introduction port 14a provided in the supply tubular portion 14 through a pipe P1. That is to say, the plunger pump 31 is connected to the blow nozzle 13 via the liquid flow path 33, which includes the pipe P1 and the supply path Fs. Accordingly, by the plunger 31b being actuated, the plunger pump 31 may supply the pressurized liquid L to the blow nozzle 13 via the liquid flow path 33.

In the illustrated example, the plunger pump 31 is a servo plunger-type pump including an electric motor (servo motor) 31c as a driving source, and the plunger 31b is configured to be driven by the electric motor 31c and actuated in the axis direction in the cylinder 31a.

The liquid circulation unit 32 has the functions of regulating the liquid L to a predetermined temperature and supplying the liquid L to the plunger pump 31 through a pipe R2 while replenishing additional liquid L through a pipe R1 and of circulating the liquid L between the plunger pump 31 and the supply path Fs while regulating the liquid L to a predetermined temperature. That is to say, the liquid L may be circulated around a circulation path CR formed along the supply path Fs→discharge port 14b→pipe R3→liquid circulation unit 32→pipe R2→plunger pump 31→pipe P1→introduction port 14a→supply path Fs, as needed.

Two electromagnetic opening-closing valves V1 and V2 of the circulation path CR are disposed in the circulation path CR, and predetermined flow paths are opened and closed by the corresponding opening-closing valves V1 and V2 of the circulation path CR in accordance with processes in blow molding.

The supply tubular portion 14 is provided with a connection port 14e communicating with the blow nozzle 13 via the supply hole 14d. To the connection port 14e, a deaeration mechanism configured to suck out air that is present within the preform PF prior to blow molding, a mechanism configured to dispel the liquid L remaining within the connection port 14e by supplying low-pressure air into the connection port 14e momentarily, or the like may be connected.

As illustrated in FIG. 2, the holding member 12 is provided with air space S, which is defined for pressurizing the outside of a mouth and surrounds an outer circumference of the mouth tubular portion PFb of the preform PF fitted to the mold 1.

On the other hand, as illustrated in FIG. 1, to pressurize air in the air space S, which is defined for pressurizing the outside of the mouth, a cylinder 35, which is used for conversion to air for the outside of the mouth, is disposed between the air space S and the plunger pump 31. The pipe P1, that is to say, the liquid flow path 33 branches into a liquid pressure supply path 34, and the cylinder 35, which is used for conversion to air for the outside of the mouth, is connected to the liquid pressure supply path 34. The cylinder 35, which is used for conversion to air for the outside of the mouth, includes a cylinder 35a and a piston 35b disposed in the cylinder 35a in a manner such that the plunger 35b is freely displaceable. The cylinder 35, which is used for conversion to air for the outside of the mouth, also has one end side, as defined by the piston 35b disposed in the cylinder 35a, that is connected to the pipe P1 via the liquid pressure supply path 34 and another end side that is connected to the air space S, which is defined for pressurizing the outside of the mouth, via the pressurizing flow path 36. The cylinder 35, which is used for conversion to air for the outside of the mouth, is actuated by a pressure of the liquid L that is applied from the plunger pump 31 via the liquid pressure supply path 34 and converts the pressure of the liquid L to an air pressure to be applied to the air space S, which is defined for pressurizing the outside of the mouth, and accordingly, the cylinder 35 increases the air pressure to be applied to the outer circumference of the mouth tubular portion PFb of the preform PF, namely, the air pressure to be applied to the outside of the mouth.

Furthermore, as described later, the cylinder 35, which is used for conversion to air for the outside of the mouth, may serve as an accumulator that accumulates the pressure of the liquid L that is applied from the plunger pump 31 via the liquid pressure supply path 34 as the air pressure to be applied to the outside of the mouth, in other words, the air pressure to be applied to the outer circumference of the mouth tubular portion PFb of the preform PF.

Between the pipe P1 and the cylinder 35, that is to say, in the liquid pressure supply path 34, there is also disposed an opening-closing valve V3 of the cylinder 35, which is used for conversion to air for the outside of the mouth, as an opening-closing valve of the accumulator. In the illustrated example, the opening-closing valve V3 of the cylinder 35, which is used for conversion to air for the outside of the mouth, is configured by a (normally closed) electromagnetic (solenoid) valve, and actuation of the opening-closing valve V3 may be controlled in accordance with turn-on and turn-off to open and close the liquid pressure supply path 34.

Note that FIG. 1 illustrates the opening-closing valve V3 of the cylinder 35, which is used for conversion to air for the outside of the mouth, in its opened state.

Furthermore, the pressurizing flow path 36 is provided with an opening-closing valve V4, which is used for pressurizing air outside the mouth. In the illustrated example, the opening-closing valve V4, which is used for pressurizing air outside the mouth, is configured by a (normally closed) electromagnetic (solenoid) valve, and actuation of the opening-closing valve V4 may be controlled in accordance with turn-on and turn-off to open and close the pressurizing flow path 36. Note that FIG. 1 illustrates the opening-closing valve V4, which is used for pressurizing air outside the mouth, in its opened state.

The blow molding apparatus includes a control device 37, to which the electric motor 31c is connected, and the control device 37 controls actuation of the electric motor 31c. The control device 37 may also be configured to perform control in cooperation with a control system that controls movement of the sealing body 15, the stretching rod 17, the opening-closing valves V1 to V4, and others included in the blow molding apparatus or configured as a component of the control system.

In thus configured blow molding apparatus according to the present disclosure, by actuating the plunger pump 31 and by displacing the sealing body 15 upward to open the supply hole 14d, and thus, the blow nozzle 13, the pressurized liquid L is supplied (filled) from the plunger pump 31 into the preform PF through the blow nozzle 13, and accordingly, the preform PF is blow molded into a shape conforming to the cavity 2 of the mold 1.

Furthermore, in the blow molding apparatus according to the present disclosure, by actuating the plunger pump 31, the air pressure, to be applied to the outside of the mouth, may be accumulated in the cylinder 35, which is used for conversion to air for the outside of the mouth, in advance before the supply of the liquid L into the preform PF. That is to say, the plunger pump 31 is actuated in a state where the blow nozzle 13 is closed by the sealing body 15, where the opening-closing valves V1 and V2 of the circulation path CR are closed, where the opening-closing valve V3 of the cylinder 35, which is used for conversion to air for the outside of the mouth, is opened, and where the opening-closing valve V4, which is used for pressurizing air outside the mouth, is closed, and in response to the actuation of the plunger pump 31, the cylinder 35 is actuated to increase an air pressure in the pressurizing flow path 36. Then, in this state, the opening-closing valve V3 of the cylinder 35, which is used for conversion to air for the outside of the mouth, is closed to cause the cylinder 35 to serve as the accumulator in which the air pressure to be applied to the outside of the mouth may be accumulated.

Then, during blow molding where the pressurized liquid L is supplied into the preform PF through the blow nozzle 13 by actuating the plunger pump 31 and by opening the sealing body 15, the opening-closing valve V4, which is used for pressurizing air outside the mouth, is opened, and the air pressure, to be applied to the outside of the mouth, that is under pressurization in the pressurizing flow path 36 is supplied to the air space S, which is defined for pressurizing the outside of the mouth, thereby increasing the air pressure in the air space S. Thus, during blow molding of the preform PF, the air pressure in the air space S, which is defined for pressurizing the outside of the mouth, is increased, and accordingly, diameter increase and deformation of the mouth tubular portion PFb are prevented.

Moreover, in the blow molding apparatus according to the present disclosure, the air pressure, to be applied to the outside of the mouth, that is accumulated in the cylinder 35, which is used for conversion to air for the outside of the mouth, is utilized not only for the aforementioned prevention of diameter increase and deformation of the mouth tubular portion PFb but also for pressurization of the liquid L used in blow molding. That is to say, during blow molding where the pressurized liquid L is supplied into the preform PF through the blow nozzle 13 by actuating the plunger pump 31 and by opening the sealing body 15, the opening-closing valve V3 of the cylinder 35, which is used for conversion to air for the outside of the mouth, is opened, and the air pressure, to be applied to the outside of the mouth, that is accumulated in the cylinder 35 is applied to the liquid L supplied into the preform PF. Consequently, the liquid L supplied into the preform PF is pressurized to the prescribed peak pressure more quickly compared with cases where the liquid L is pressurized solely by the plunger pump 31. At this time, the opening of the opening-closing valve V3 of the cylinder 35, which is used for conversion to air for the outside of the mouth, may be timed to occur immediately before the opening of the sealing body 15 and to last until before the liquid L supplied into the preform PF reaches the prescribed peak pressure, and by doing so, the liquid L is pressurized to the prescribed peak pressure efficiently and quickly.

Additionally, pressure sensors 38a and 38b are respectively connected to the pipe P1 and the pipe R3 to detect the pressure of the liquid L supplied into the preform PF.

Figure 3:
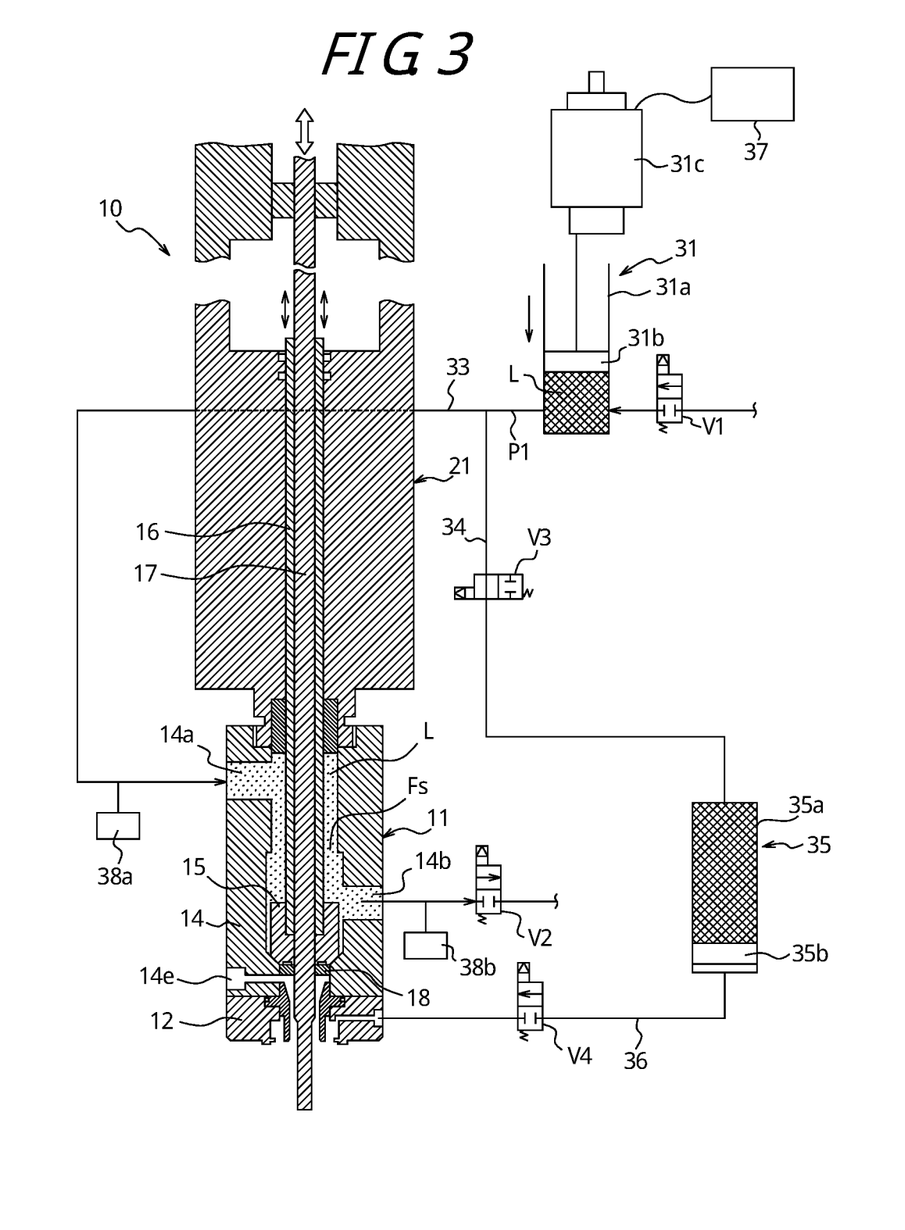
FIG. 3 illustrates a state where an air pressure, to be applied to the outside of a mouth, is accumulated in a cylinder used for conversion to air for the outside of the mouth.
Figure 4:
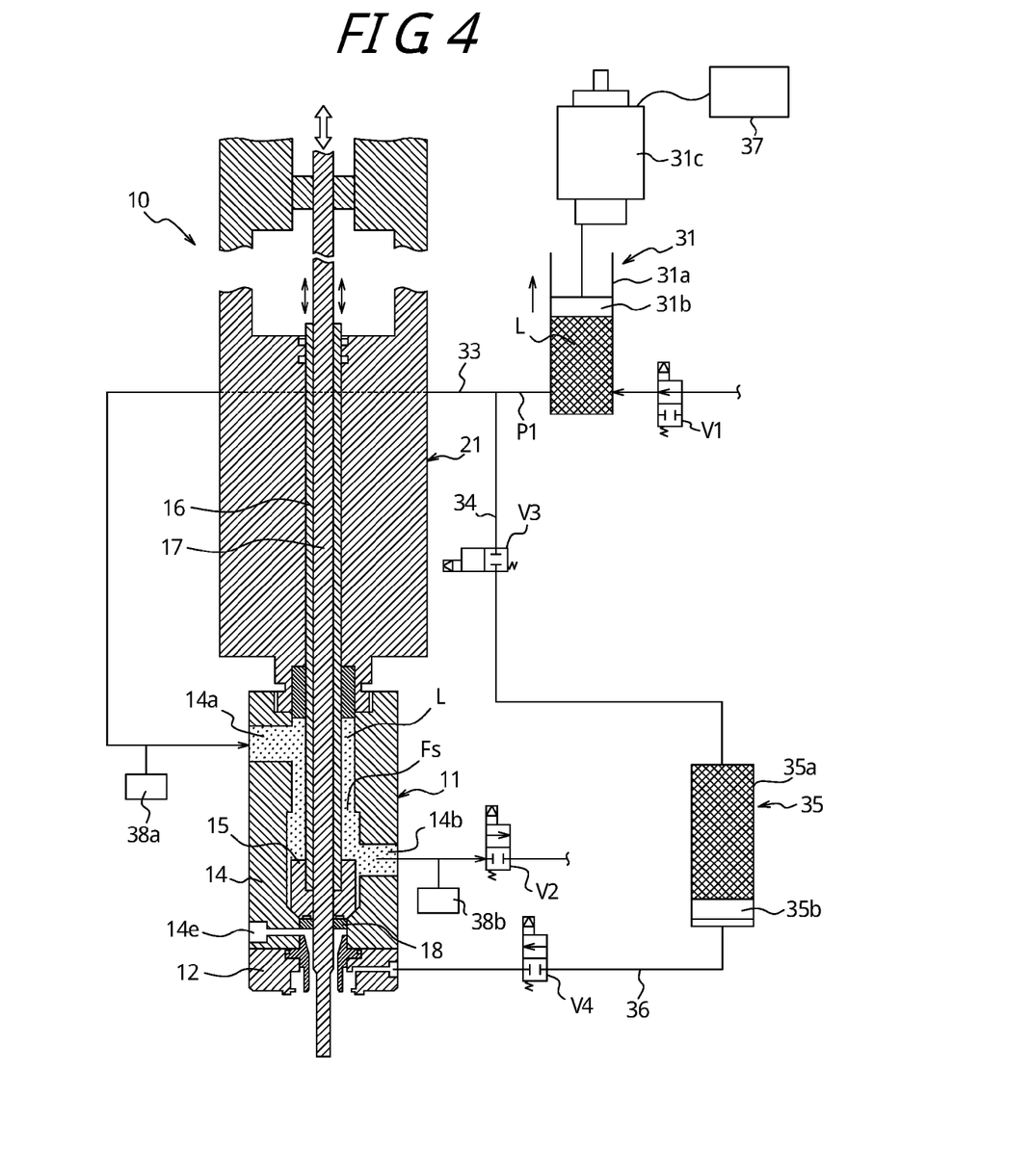
FIG. 4 illustrates a state where a liquid is supplied to a plunger pump after an air pressure, to be applied to the outside of a mouth, is accumulated in a cylinder for conversion to air for the outside of the mouth.
Figure 5:
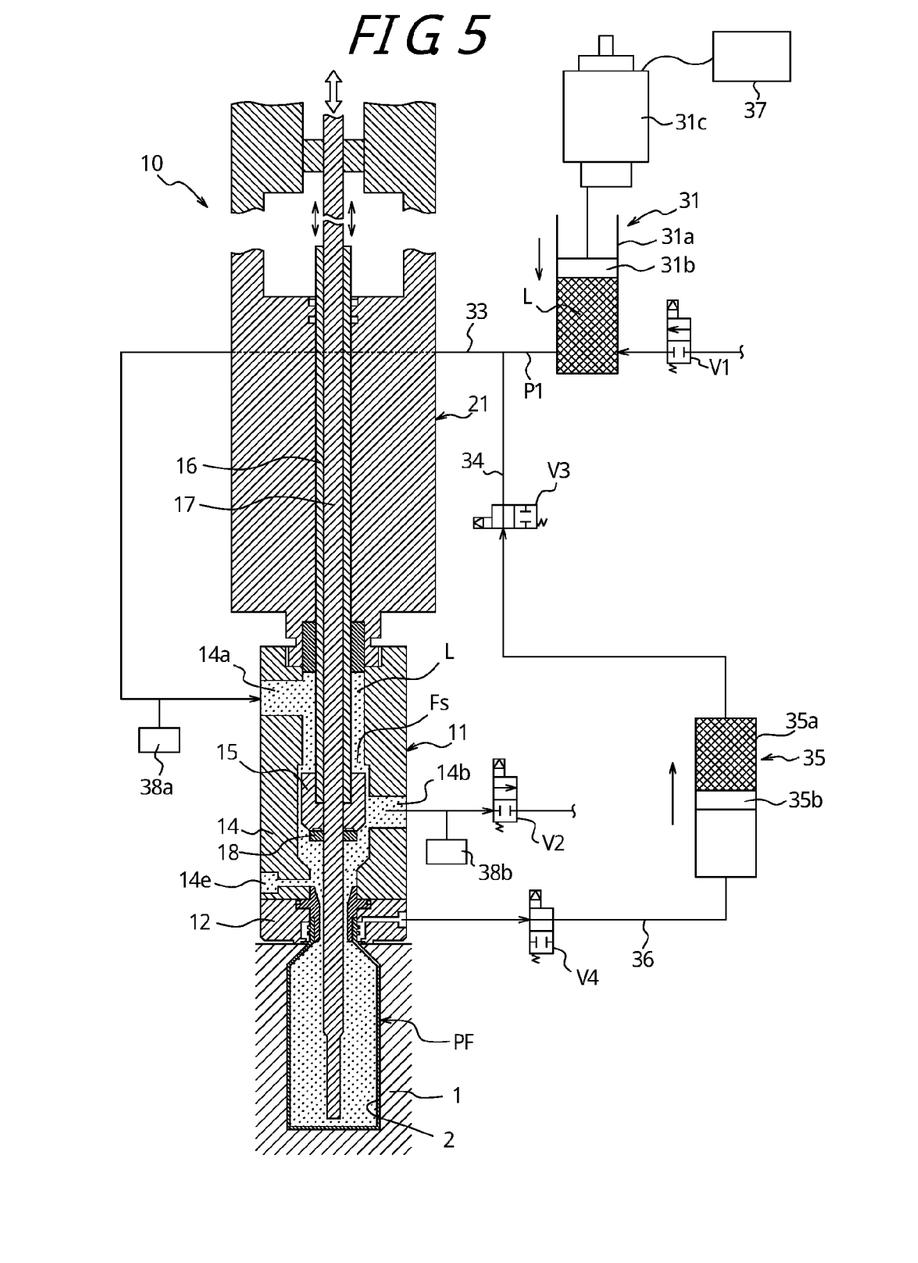
FIG. 5 illustrates a state where a pressurized liquid is supplied into a preform for blow molding.

FIG. 3 illustrates a state where the air pressure, to be applied to the outside of the mouth, is accumulated in the cylinder used for conversion to air for the outside of the mouth, and FIG. 4 illustrates a state where the liquid is supplied to the plunger pump after the air pressure, to be applied to the outside of the mouth, is accumulated in the cylinder used for conversion to air for the outside of the mouth, and FIG. 5 illustrates a state where the pressurized liquid is supplied into the preform for blow molding.

The following describes a procedure of forming a bottle by blow molding the preform PF by using such a blow molding apparatus, with reference to FIGS. 3 to 5 as needed.

As illustrated in FIG. 3, in the blow molding apparatus according to the present disclosure, firstly, while the mold 1 is opened and the nozzle unit 10 is displaced upward, the plunger pump 31 is actuated in the state where the blow nozzle 13 is closed by the sealing body 15, where the opening-closing valves V1 and V2 of the circulation path CR are closed, where the opening-closing valve V3 of the cylinder 35, which is used for conversion to air for the outside of the mouth, is opened, and where the opening-closing valve V4, which is used for pressurizing air outside the mouth, is closed. Thus, the cylinder 35, which is used for conversion to air for the outside of the mouth, is actuated by the pressure of the liquid L supplied from the plunger pump 31 to increase the air pressure in the pressurizing flow path 36. Then, by closing the opening-closing valve V3 of the cylinder 35, which is used for conversion to air for the outside of the mouth, in the state where the air pressure in the pressurizing flow path 36 is increased, the cylinder 35 serves as an accumulator in which a predetermined value of air pressure, to be supplied to the outside of the mouth, is accumulated.

Subsequently, as illustrated in FIG. 4, the opening-closing valve V1 of the circulation path CR is opened to cause reverse actuation of the plunger pump 31 in a suction direction, to thereby supply additional liquid L from the liquid circulation unit 32 to the plunger pump 31. At this time, the sealing body 15 and the opening-closing valve V3 of the cylinder 35, which is used for conversion to air for the outside of the mouth, remain closed.

Subsequently, the preform PF which, except for the mouth tubular portion PFb, is heated to a temperature suitable for blow molding is fitted to the mold 1 used for blow molding, with the mouth tubular portion PFb being protruded upward, and the mold 1 is closed. Then, the nozzle unit 10 is displaced downward so that the neck ring PFc is sandwiched between the holding member 12 and the upper surface of the mold 1 and that the preform PF is held to the mold 1.

At this time, with the opening-closing valves V1 and V2 of the circulation path CR being opened, the liquid L may be circulated through the circulation path CR while being regulated to the predetermined temperature by the liquid circulation unit 32. This state is illustrated in FIG. 1.

After that, as represented by the two-dot chain line in FIG. 2, the stretching rod 17 is displaced downward to cause the stretching rod 17 to stretch the preform PF in the longitudinal (axial) direction.

Then, during or after the stretching of the preform PF in the longitudinal (axial) direction by the stretching rod 17, the opening-closing valves V1 and V2 of the circulation path CR are closed to stop the circulation of the liquid L around the circulation path CR, and the sealing body 15, together with the shaft body 16, is displaced upward to open the supply hole 14d, and thus, the blow nozzle 13. Furthermore, once the sealing body 15 starts the opening movement, the control device 37 controls the electric motor 31c to be activated, which in turn causes the plunger 31b to start to actuate. Consequently, the pressurized liquid L pumped from the plunger pump 31 is supplied into the preform PF through the supply hole 14d and the blow nozzle 13 for blow molding the preform PF. This state is illustrated in FIG. 5.

Furthermore, during blow molding where the sealing body 15 is opened, the opening of the opening-closing valve V3 of the cylinder 35, which is used for conversion to air for the outside of the mouth, may be timed to occur immediately before the opening of the sealing body 15 and to last until before the pressure of the liquid L supplied into the preform PF is increased to the prescribed peak pressure, and by doing so, the air pressure, to be applied to the outside of the mouth, that is accumulated in the cylinder 35 is applied to the liquid L flowing in the liquid flow path 33, that is to say, the liquid L to be supplied into the preform PF, via the liquid pressure supply path 34. Consequently, the liquid L supplied into the preform PF is pressurized to the prescribed peak pressure more quickly by the pressure applied from the cylinder 35, which is used for conversion to air for the outside of the mouth, compared with cases where the liquid L is pressurized solely by the plunger pump 31. Accordingly, shaping characteristics of the blow molded bottle are enhanced, and a shrinkage rate of the bottle resulting from molding is reduced to increase a capacity of the bottle. Thus, moldability of the bottle by using the blow molding apparatus is enhanced.

Moreover, during blow molding where the sealing body 15 is opened, the valve V4, which is used for pressurizing air outside the mouth, is opened, so that the air pressure, to be applied to the outside of the mouth, that is increased in the pressurizing flow path 36 by the cylinder 35, which is used for conversion to air for the outside of the mouth, is supplied to the air space S, which is defined for pressurizing the outside of the mouth, thereby increasing the air pressure in the air space S. This also prevents diameter increase and deformation of the mouth tubular portion PFb caused by the pressurized liquid L supplied into the preform PF.

By blow molding as described above, the preform PF is expanded and stretched in the lateral (radial) direction by using the pressure of the liquid L supplied from the plunger pump 31 and is molded into a bottle having a shape conforming to the cavity 2 of the mold 1.

Additionally, as needed, a suck back process of actuating the plunger 31b of the plunger pump 31 in the return direction to suck in the liquid L through the supply hole 14d a may also be performed to regulate the amount of the liquid L to be filled.

Once blow molding is completed, the supply hole 14d, and thus, the blow nozzle 13 are closed by displacing the sealing body 15, together with the shaft body 16, downward. When the blow nozzle 13 is closed by the sealing body 15, the sealing body 15 and the valves V1 and V2 of the circulation path CR are closed, and only the opening-closing valve V3 of the cylinder 35, which is used for conversion to air for the outside of the mouth, is opened. Accordingly, the pressurized liquid L is supplied to the cylinder 35, which is used for conversion to air for the outside of the mouth, through the liquid pressure supply path 34 by the plunger pump 31, and the cylinder 35 is actuated to increase the air pressure in the pressurizing liquid path 36. Then, in the state where the air pressure in the pressurizing liquid path 36 is increased, the opening-closing valve V3 of the cylinder 35, which is used for conversion to air for the outside of the mouth, is closed, and accordingly, an air pressure, to be applied to the outside of the mouth, that is to be used in the next blow molding is accumulated in advance in the cylinder 35.

After the air pressure, to be applied to the outside of the mouth, is accumulated in advance in the cylinder 35, which is used for conversion to air for the outside of the mouth, each of the valves V1 and V2 of the circulation path CR is brought into its opened states to restart the circulation of the liquid L around the circulation path CR. Then, the nozzle unit 10 is displaced upward, the blow nozzle 13 is detached from a mouth tubular portion of the bottle obtained by blow molding, and the mold 1 is opened to remove the liquid L filled bottle, and the mouth tubular portion of the bottle is sealed with a cap or the like. Thus, a final product of the bottle containing the liquid L as the content liquid is completed.

Figure 6:
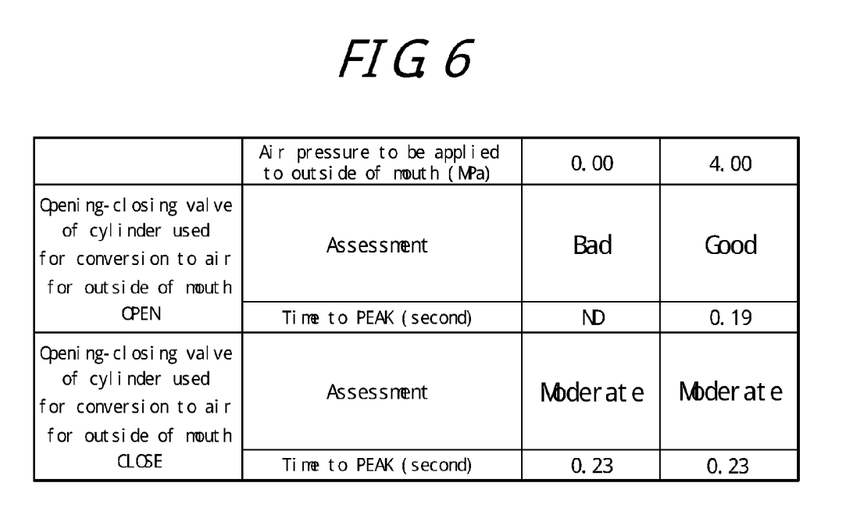
FIG. 6 illustrates a result of comparison between Example according to the present disclosure and Comparison Examples, in terms of assessment of a time period necessary for a liquid supplied into a preform to reach the peak pressure and moldability of a bottle then.

FIG. 6 illustrates a result of comparison between Example according to the present disclosure and Comparison Examples, in terms of assessment of a time period necessary for a liquid supplied into the preform to reach the peak pressure and moldability of a bottle then.

As illustrated in FIG. 6, in Example, an air pressure, to be applied to the outside of the mouth, of 4.0 MPa is accumulated in advance in the cylinder 35, which is used for conversion to air for the outside of the mouth, by actuating the plunger pump 31 before the supply of the liquid L into the preform PF, and then, during the supply of the pressurized liquid L into the preform PF, the valve V3 of the cylinder 35 and the valve V4, which is used for pressurizing air outside the mouth, are opened to apply the air pressure, to be applied to the outside the mouth, that is accumulated in the cylinder 35 to the liquid L to be supplied into the preform PF. In this case, the time period necessary for the liquid L to be pressurized to the prescribed peak pressure is 0.19 seconds, and moldability of the bottle is assessed as good.

In contrast, in Comparative Example in which any air pressure, to be applied to the outside of the mouth, is not accumulated by the cylinder 35, which is used for conversion to air for the outside of the mouth, and in which the pressurized liquid L is supplied into the preform PF while the valve V3 of the cylinder 35 and the valve V4, which is used for pressurizing air outside the mouth, are opened, the liquid L cannot be pressurized to the prescribed peak pressure due to deficiency in pressurizing capability of the plunger pump 31. Accordingly, a result of detection of the time period to the peak pressure is Not Detected (ND), and moldability of the bottle is assessed as bad.

On the other hand, in another Comparative Example in which, although an air pressure, to be applied to the outside of the mouth, of 4.0 MPa is accumulated in advance in the cylinder 35, which is used for conversion to air for the outside of the mouth, by actuating the plunger pump 31 before the supply of the liquid L into the preform PF, the pressurized liquid L is supplied into the preform PF while the valve V3 of the cylinder 35 remains closed, the time period necessary for the liquid L to be pressurized to the prescribed peak pressure is 0.23 seconds, and moldability of the preform PF is assessed as moderate. Accordingly, the advantageous effect, similar to that of Example, is not obtained. Similarly, in yet another Comparative Example in which any air pressure, to be applied to the outside of the mouth, is not accumulated by the cylinder 35, which is used for conversion to air for the outside of the mouth, and in which the pressurized liquid L is supplied into the preform PF while the valve V3 of the cylinder 35 remains closed, the time period necessary for the liquid L to be pressurized to the prescribed peak pressure is 0.23 seconds, and moldability of the bottle is assessed as moderate. Accordingly, the advantageous effect, similar to that of Example, is not obtained. In this way, the two Comparative Examples in which the pressurized liquid L is supplied into the preform PF while the valve V3 of the cylinder 35 remains closed do not affect the time period necessary for the pressurization to the peak pressure of the liquid L by accumulating the air pressure, to be applied to the outside of the mouth, in the cylinder 35, which is used for conversion to air for the outside of the mouth.

As can be understood from the above results, with the configuration of Example, that is to say, the configuration in which the air pressure, to be applied to the outside of the mouth, is accumulated in advance in the cylinder 35, which is used for conversion to air for the outside of the mouth, by actuating the plunger pump 31 before the supply of the liquid L into the preform PF, and then, during the supply of the pressurized liquid L into the preform PF, the valve V3 of the cylinder 35 is opened to apply the air pressure, to be applied to the outside the mouth, that is accumulated in the cylinder 35 to the liquid L to be supplied into the preform PF, the time period necessary for the liquid L to be pressurized to the prescribed peak pressure is reduced, and moldability of the bottle is enhanced.

Figure 7:
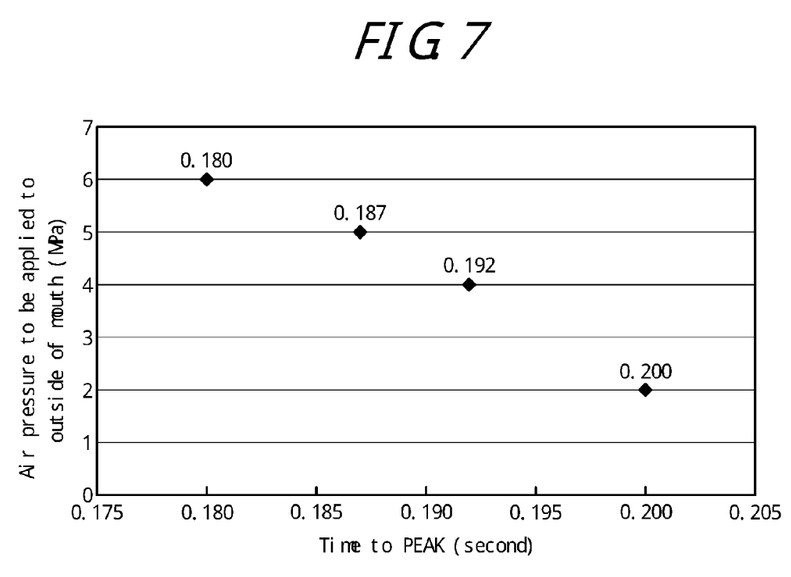
FIG. 7 illustrates a relation between a time period necessary for a liquid supplied into a preform to reach the peak pressure, and an air pressure applied to the outside of a mouth.

FIG. 7 illustrates a relation between a time period necessary for a liquid supplied into the preform to reach the peak pressure, and an air pressure applied to the outside of the mouth. FIG. 7 indicates that the time period necessary for the liquid L to be pressurized to the peak pressure is reduced to 0.200 seconds, 0.192 seconds, 0.187 seconds, and 0.180 seconds, as the air pressure, to be applied to the outside of the mouth, that is accumulated in the cylinder 35, which is used for conversion to air for the outside of the mouth, in advance before the supply of the liquid L into the preform PF is increased to 2 MPa, 4 MPa, 5 MPa, and 6 MPa. By thus increasing the air pressure, to be applied to the outside of the mouth, that is accumulated in the cylinder 35, which is used for conversion to air for the outside of the mouth, in advance before the supply of the liquid L into the preform PF, the time period necessary for the liquid L to be pressurized to the peak pressure has been found to be reduced. Accordingly, by setting the air pressure, to be applied to the outside of the mouth, that is accumulated in advance in the cylinder 35, which is used for conversion to air for the outside of the mouth, to be a given value in accordance with pressurizing capability of the plunger pump 31, the time period necessary for the liquid L to be pressurized to the peak pressure may be set to a desired value, and moldability of the bottle may be enhanced.

Needless to say, the present disclosure is not limited to the above embodiment, and various changes may be made without departing the gist of the present disclosure.

For example, in the above embodiment, by actuating the plunger pump 31 in the state where the blow nozzle 13 is closed by the sealing body 15, where the opening-closing valves V1 and V2 of the circulation path CR are closed, where the opening-closing valve V3 of the cylinder 35, which is used for conversion to air for the outside of the mouth, is opened, and where the opening-closing valve V4, which is used for pressurizing air outside the mouth, is closed, the pressured liquid L is supplied from the plunger pump 31 to the cylinder 35, and thus, the air pressure, to be applied to the outside of the mouth, is accumulated in the cylinder 35 in advance. However, the present disclosure is not limited to the above embodiment, and a pressurizing device may also be provided to drive the cylinder 35, which is used for conversion to air for the outside of the mouth. With the pressurizing device driving the cylinder 35, which is used for conversion to air for the outside of the mouth, the cylinder 35 may be actuated by a system other than the liquid L supplied from the plunger pump 31, and the air pressure, to be applied to the outside of the mouth, may be accumulated in the cylinder 35 in advance. In this case, any device, such as an electric motor (servo motor), a hydraulic cylinder, and an air cylinder, which may drive the cylinder 35, which is used for conversion to air for the outside of the mouth, for accumulation of the air pressure, to be applied to the outside of the mouth, may be employed as the pressurizing device. There may also be provided a liquid replenishing path through which the liquid L is replenished to the cylinder 35a included in the cylinder 35, as a system that is separate from the liquid circulation path 32, and the air pressure, to be applied to the outside of the mouth, may be accumulated in the cylinder 35, which is used for conversion to air for the outside of the mouth, by driving the cylinder 35 while the valve V3 of the cylinder 35 remains closed.

Furthermore, the above embodiment utilizes the cylinder 35, which is used for conversion to air for the outside of the mouth, in other words, the cylinder 35, which is used for converting the pressure of the liquid L pressurized by the plunger pump 31 to the air pressure, to be applied to the outside of the mouth to pressurize the outer circumference of the mouth tubular portion PFb of the preform PF, as the accumulator. However, the present disclosure is not limited to this embodiment, and an accumulator having a common configuration and not having functions of the cylinder 35, which is used for conversion to air for the outside of the mouth, may be connected to the liquid pressure supply path 34 extending as a branch of the liquid flow path 33. In this case, a pressurizing device used for pressurizing air outside the mouth by applying the air pressure, to be applied to the outside of the mouth, to the air space S, which is defined for pressurizing the outside of the mouth, may also be provided as a system that is separate from the accumulator. Any of differently configured devices, such as a pressurizing cylinder device driven by, for example, an electric motor (servo motor), a hydraulic cylinder, and an air cylinder, may be employed as the aforementioned pressurizing device used for pressurizing air outside the mouth, as long as the device may pressurize air in the air space S, which is defined for pressurizing the outside of the mouth.

Moreover, although in the above embodiment the air pressure, to be applied to the outside of the mouth, is accumulated in the cylinder 35, which is used for conversion to air for the outside of the mouth, before the closing of the mold 1 and the downward displacement of the nozzle unit 10, it is also possible to accumulate the air pressure in the cylinder 35 after closing the mold 1 to which the preform PF is fitted and displacing the nozzle unit 10 downward to be fitted to the mold 1.

Moreover, although in the above embodiment the plunger pump 31 is a servo plunger-type pump including the plunger 31b driven by the electric motor 31c, the present disclosure is not limited to the above embodiment, and the plunger 31b may also be configured to be driven by any other driving mechanism, such as a hydraulic cylinder and an air cylinder.

Moreover, although in the above embodiment the liquid L is circulated around the circulation path CR, the present disclosure is not limited to the above embodiment, and the liquid L does not need to be circulated as long as the pressurized liquid L may be supplied from the plunger pump 31 into the preform PF through the liquid flow path 33 and the blow nozzle 13.

Moreover, the preform PF may be expanded and stretched in both the longitudinal (axial) and the lateral (radial) direction into a bottle having a shape conforming to the cavity 2 of the mold 1 by using only the pressure caused by the liquid L supplied from the plunger pump 31 without using the stretching rod 17.

Moreover, as the preform PF, the one with a shape including the main body portion PFa and the mouth tubular portion PFb and not including the neck ring PFc may also be used. Moreover, the material of the preform PF is not limited to polypropylene, and another resin material may also be used.

REFERENCE SIGNS LIST

1 Mold
2 Cavity
10 Nozzle unit
11 Filling head portion
12 Holding member
13 Blow nozzle
14 Supply tubular portion
14a Introduction port
14b Discharge port
14c Sealing surface
14d Supply hole
14e Connection port
15 Sealing body
15a Abutment surface
16 Shaft body
17 Stretching rod
18 Guiding body
21 Support portion
31 Plunger pump (pressurized liquid supply unit)
31a Cylinder
31b Plunger
31c Electric motor
32 Liquid circulation unit
33 Liquid flow path
34 Liquid pressure supply path
35 Cylinder used for conversion to air for outside of mouth (accumulator)
35a Cylinder
35b Piston
36 Pressurizing flow path
37 Control device
38a Pressure sensor
38b Pressure sensor
PF Preform
PFa Main body portion
PFb Mouth tubular portion
PFc Neck ring
Fs Supply path
P1 Pipe
L Liquid
R1 Pipe
R2 Pipe
R3 Pipe
CR Circulation path
V1 Opening-closing valve of circulation path CR
V2 Opening-closing valve of circulation path CR
V3 Opening-closing valve of cylinder 35, which is used for conversion to air for outside of mouth (opening-closing valve of accumulator 35)
V4 Opening-closing valve used for pressurizing air outside mouth
S Air space defined for pressurizing outside of mouth

The invention claimed is:

1. A blow molding apparatus that supplies a pressurized liquid into a bottomed tubular preform fitted to a mold used for blow molding and molds the preform into a shape conforming to a cavity of the mold, the blow molding apparatus comprising:
   a blow nozzle fitted to a mouth tubular portion of the preform;
   a sealing body configured to open and close the blow nozzle;
   a pressurized liquid supply unit connected to the blow nozzle via a liquid flow path;
   an accumulator that is in branch connection with the liquid flow path; and
   an opening-closing valve of the accumulator that is disposed between the liquid flow path and the accumulator, wherein
   a pressure is accumulated in the accumulator in advance, with the opening-closing valve of the accumulator being closed, and
   when the pressurized liquid is supplied into the preform through the blow nozzle by actuating the pressurized liquid supply unit and by opening the sealing body, the opening-closing valve of the accumulator is opened to thereby apply the pressure accumulated in the accumulator to the liquid supplied into the preform.

2. The blow molding apparatus of claim 1, wherein the opening of the opening-closing valve of the accumulator is timed to occur immediately before the opening of the sealing body and to last until before the liquid supplied into the preform reaches a peak pressure.

3. The blow molding apparatus of claim 1, wherein the pressure is accumulated in the accumulator in advance, by actuating the pressurized liquid supply unit in a state where the blow nozzle is closed by the sealing body and where the opening-closing valve of the accumulator is opened, and subsequently by closing the opening-closing valve of the accumulator.

4. The blow molding apparatus of claim 1, further comprising: a pressurizing device that drives the accumulator, wherein the pressure is accumulated in the accumulator in advance, by driving the accumulator by the pressurizing device.

5. The blow molding apparatus of claim 1, further comprising:
- air space defined for pressurizing an outside of a mouth and surrounding an outer circumference of a mouth tubular portion of the preform fitted to the mold, wherein
- the accumulator comprises a cylinder used for conversion to air for the outside of the mouth, the cylinder having one end connected to the liquid flow path and another end connected, through a pressurizing flow path, to the air space defined for pressurizing the outside of the mouth.

6. The blow molding apparatus of claim 3, further comprising:
- air space defined for pressurizing an outside of a mouth and surrounding an outer circumference of a mouth tubular portion of the preform fitted to the mold, wherein
- the accumulator comprises a cylinder used for conversion to air for the outside of the mouth, the cylinder having one end connected to the liquid flow path and another end connected, through a pressurizing flow path, to the air space defined for pressurizing the outside of the mouth.

7. The blow molding apparatus of claim 4, further comprising:
- air space defined for pressurizing an outside of a mouth and surrounding an outer circumference of a mouth tubular portion of the preform fitted to the mold, wherein
- the accumulator comprises a cylinder used for conversion to air for the outside of the mouth, the cylinder having one end connected to the liquid flow path and another end connected, through a pressurizing flow path, to the air space defined for pressurizing the outside of the mouth.

8. The blow molding apparatus of claim 5, wherein
the pressurizing flow path is provided with an opening-closing valve used for pressurizing air outside the mouth, wherein
the opening-closing valve used for pressurizing air outside the mouth is closed when the pressure is accumulated in the accumulator in advance and is opened when the pressurized liquid is supplied into the preform by opening the sealing body.

9. The blow molding apparatus of claim 6, wherein
the pressurizing flow path is provided with an opening-closing valve used for pressurizing air outside the mouth, wherein
the opening-closing valve used for pressurizing air outside the mouth is closed when the pressure is accumulated in the accumulator in advance and is opened when the pressurized liquid is supplied into the preform by opening the sealing body.

10. The blow molding apparatus of claim 7, wherein
the pressurizing flow path is provided with an opening-closing valve used for pressurizing air outside the mouth, wherein
the opening-closing valve used for pressurizing air outside the mouth is closed when the pressure is accumulated in the accumulator in advance and is opened when the pressurized liquid is supplied into the preform by opening the sealing body.

11. The blow molding apparatus of claim 1, wherein the pressurized liquid supply unit comprises a servo plunger-type plunger pump.

12. The blow molding apparatus of claim 3, wherein the pressurized liquid supply unit comprises a servo plunger-type plunger pump.

13. The blow molding apparatus of claim 4, wherein the pressurized liquid supply unit comprises a servo plunger-type plunger pump.

14. The blow molding apparatus of claim 5, wherein the pressurized liquid supply unit comprises a servo plunger-type plunger pump.

15. The blow molding apparatus of claim 6, wherein the pressurized liquid supply unit comprises a servo plunger-type plunger pump.

16. The blow molding apparatus of claim 7, wherein the pressurized liquid supply unit comprises a servo plunger-type plunger pump.

17. The blow molding apparatus of claim 8, wherein the pressurized liquid supply unit comprises a servo plunger-type plunger pump.

18. The blow molding apparatus of claim 9, wherein the pressurized liquid supply unit comprises a servo plunger-type plunger pump.

19. The blow molding apparatus of claim 10, wherein the pressurized liquid supply unit comprises a servo plunger-type plunger pump.

* * * * *